United States Patent [19]

Jones

[11] 3,944,289

[45] Mar. 16, 1976

[54] SKID CONTROL SYSTEM

[75] Inventor: James J. Jones, Plano, Tex.

[73] Assignee: Texas Instruments Incorporated, Dallas, Tex.

[22] Filed: Mar. 25, 1974

[21] Appl. No.: 454,334

[52] U.S. Cl. .............................. 303/21 BE; 303/20
[51] Int. Cl.² ........................................ B60T 8/08
[58] Field of Search ............. 188/181 A; 303/20, 21; 307/10 R; 317/5; 324/162; 340/53, 62, 262

[56] References Cited
UNITED STATES PATENTS

| | | | |
|---|---|---|---|
| 3,494,671 | 2/1970 | Slavin et al. | 303/21 P |
| 3,584,921 | 6/1971 | Crawford | 303/21 BE |
| 3,606,490 | 9/1971 | Ando | 303/21 CG UX |
| 3,622,977 | 11/1971 | Wakamatsu et al. | 303/21 CG X |
| 3,647,267 | 3/1972 | Scharlack | 303/21 P |
| 3,652,133 | 3/1972 | Yamazaki et al. | 303/21 CG |
| 3,709,567 | 1/1973 | Van Ostrom et al. | 303/21 P X |
| 3,710,186 | 1/1973 | Sharp | 188/181 A X |
| 3,717,384 | 2/1973 | Harned | 303/21 P X |
| 3,822,921 | 7/1974 | Jones | 303/21 BE |

*Primary Examiner*—Trygve M. Blix
*Assistant Examiner*—Stephen G. Kunin
*Attorney, Agent, or Firm*—Harold Levine; James T. Comfort; William E. Hiller

[57] ABSTRACT

An anti-skid control system for vehicle brakes which is much simpler and of lower cost than prior art systems and yet provides substantially the same anti-skid brake control. The system includes a frequency-voltage converter to produce a voltage signal indicative of wheel speed which is utilized as an input to a deceleration rate detector and an acceleration differentiator connected in parallel. The acceleration differentiator provides control signals to the deceleration rate detector to set threshold values therefor. When both the deceleration rate detector and the acceleration differentiator produce output signals of proper type to an AND gate, the system deactivates the normal braking system for the vehicle to avoid a potential skid condition. The system includes an override for applying brakes when an acceleration exceeds a predetermined threshold value.

5 Claims, 3 Drawing Figures

SKID CONTROL SYSTEM

This invention relates to a skid control system and, more specifically, to a skid control system which utilizes a programmed imaginary ramp signal which is a function of wheel acceleration and/or deceleration so that brakes can be properly applied or released at a point prior to reaching vehicle speed to prevent skid problems.

The problem of skidding of large vehicles such as trucks and the like due to overbraking by the driver whereby the wheels brake away from the vehicle speed is a recognized problem in the art and many anti-skid control systems have been devised to alleviate this problem. Such systems in the past have been expensive and complex to the point that the use of such systems has not found widespread use at this time due to the economics involved. It is therefore the desire of the art to provide anti-skid control systems which are of relatively less cost, have relatively diminished complexity as compared to the systems heretofore known and which are sufficiently compact to be easily located in a vehicle without taking up an excessive amount of space. As stated above, a skid control system is designed to compensate for overbraking by the driver so that if the wheels of the truck brake away from the vehicle speed and start to decelerate at an abnormal rate, whereby the vehicle cannot stop at that rate and approaches wheel lock-up, the skid control system will recognize this condition and provide an output signal to release brakes so that the wheels can spin back up to the vehicle speed. This system would also provide a signal to apply brakes at a time just before the wheels return to the vehicle speed and therefore must anticipate these conditions.

In accordance with the present invention there is provided an anti-skid control system which includes a control circuit capable of recognizing an excessive increase in the deceleration of the wheels relative to vehicle speed and thereby provide a brake inhibiting signal to release the brakes so the wheels spin back up to the vehicle speed, this being a function of an imaginary ramp signal which is programmed by the control system. The system is designed whereby, when the imaginary ramp signal rate coincides with the input signal rate, a brake inhibiting signal is provided to release the brakes. The imaginary ramp curve can be altered between predefined limits, the alteration being provided by the control circuit and being responsive to detected acceleration signals.

It is therefore an object of this invention to provide a skid control system which is relatively simple and of low cost as compared with prior art systems.

It is the further object of this invention to provide a skid control system wherein an imaginary ramp is programmed internally of the system and provides for release of brakes when the programmed ramp rate and the input signal rate, which is a function of wheel speed, coincide.

The above objects and still further objects of the invention will immediately become apparent to those skilled in the art after consideration of the following preferred embodiment thereof, which is provided by way of example and not by way of limitation, wherein.

Figure 1:
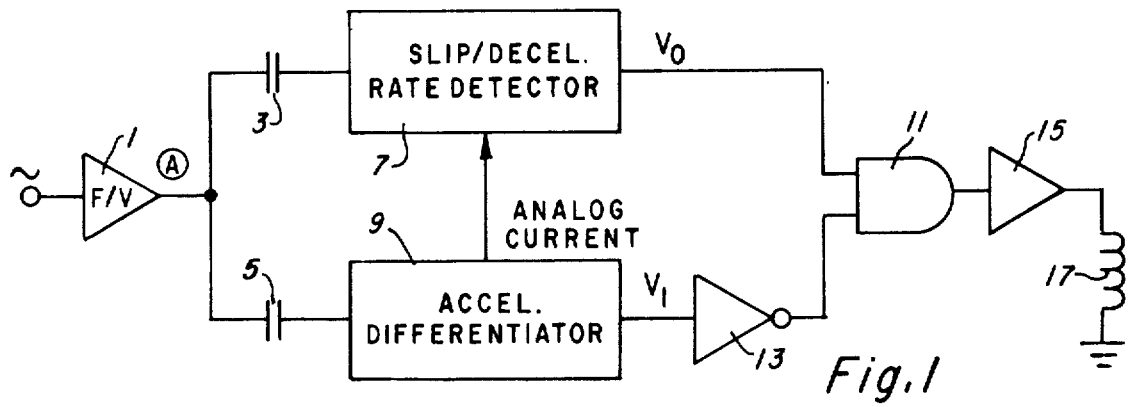
FIG. 1 is a block diagram of a skid control system in accordance with the present invention.

Referring now to FIG. 1, there is shown a schematic diagram of the skid control system in accordance with the present invention. The system accepts an AC signal at the input of the frequency to voltage converter 1, the AC signal having a frequency which is proportional to the speed of the wheels of the vehicle, the signal coming from a transducer in the vehicle in well-known manner. The alternating current signal is converted to a DC voltage in the frequency to voltage converter 1, the DC voltage being proportional to the input frequency and therefore also providing a representation of wheel speed of the vehicle. This DC signal, A, is fed simultaneously through a pair of capacitors 3 and 5 to a slip/deceleration rate detector 7 and an acceleration differentiator 9. The detector 7 is responsive to deceleration signals which have a negative slope and provides an output if the negative slope exceeds a certain rate threshold, this output being $V_0$ and being fed to an AND gate 11. This negative slope is provided when the DC voltage is decreasing in value. The acceleration differentiator 9 is responsive to positive going slope signals and has a pair of outputs, one being an analog current proportional to the rate of acceleration which is fed to the detector 7 and the other being a signal $V_1$ which is fed to the AND gate 11 through an inverter 13 when a predetermined threshold acceleration has been exceeded. The pair of outputs for the acceleration differentiator 9 do not necessarily occur simultaneously, since the signal $V_1$ comprising the other output only occurs when the wheel speed signal A has a positive going slope indicative of an acceleration exceeding a predetermined threshold acceleration.

The AND gate 11 is turned on, this being a no brake or brake inhibiting condition, when there is an output $V_0$ and no output $V_1$ or, in logical terms, when $V_0$ is a 1 and $V_1$ is a zero. The output of the gate 11 goes through an amplifier 15 to a circuit 17 for controlling the brakes.

The output from the AND gate 11 will go off when the output from the detector 7 goes off, this point being determined by an imaginary ramp which is generated in a manner to be described in detail hereinbelow. $V_0$ is therefore turned off when the input signal A exceeds the predetermined internally programmed threshold.

The acceleration differentiator 9 programs an imaginary ramp as discussed above, this depending on how fast the input is changing or if the acceleration is on a positive going slope. If the acceleration is along a positive slope and is very rapid, the acceleration differentiator 9 programs the imaginary ramp to come down very quickly in value and intersect the input signal value A which in turn will cause the output $V_0$ to go off and provide a braking condition. This provides a shorter time to provide a no brake or brake inhibiting condition when the wheels are spinning up very quickly. If the spin rate is slow, then the imaginary ramp developed by the program has a less steep slope so that the intersection therewith with the input signal A comes later in the pulse time and thereby holds off braking by retaining a brake inhibiting condition for a longer period of time to allow the wheels to spin up to a more rapid rate. If there is no input A to the circuit or a constant input, since the wheels are turning at constant speeds, the circuit, in a preferred embodiment, has a threshold of about 45 feet per second$^2$, and if the vehicle operator slams on the brakes, and the wheels exceed the 45 feet per second$^2$ deceleration rate, then the threshold stays the same during the deceleration portion of the cycle and after the threshold is exceeded, to produce a brake inhibiting condition the brakes are released after a time delay and the wheels then start to spin up to provide an acceleration signal. This positive slope will immediately switch the threshold of the imaginary ramp to about 5 feet per second$^2$. This places the imaginary ramp in its slowest mode. If the wheels accelerate faster than 5 feet per second$^2$, the system starts programming a higher current and starts raising the threshold toward 45 feet per second$^2$ or even higher. The imaginary ramp can be positioned somewhere in the range between 5 and 200 feet per second$^2$, in the preferred embodiment, depending on how fast the wheels are accelerating.

Figure 2:
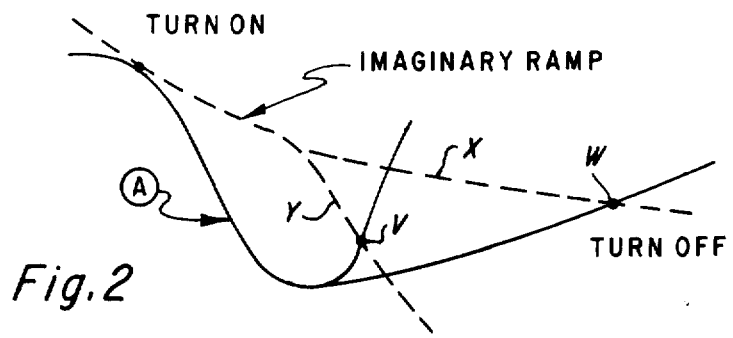
FIG. 2 is a graph showing the imaginary ramp produced by the circuitry in accordance with the present invention as well as the input signal to the circuit to show when brake turnoff conditions exist.

The above is shown in FIG. 2, where the solid line represents the input signal A and the dotted line represents the imaginary ramp. When the input signal A is below the threshold of the imaginary ramp, a signal $V_0$ will be provided and there will be a no brake or brake inhibiting condition, provided the acceleration override, which will be explained in detail hereinbelow, is not then in operation. If an analog current signal from the acceleration differentiator 9 suddenly changes the ramp from the normal position X to the low position Y, and there is a sudden change from rapid deceleration to slow acceleration or rapid acceleration, the signal $V_0$ will be turned off when the imaginary ramp signal and the input signal cross at the point V. As another example, when the imaginary ramp is not suddenly altered and the input signal changes from rapid deceleration to slow acceleration, the signal $V_0$ will be removed at W when the two curves intersect.

As will be explained in detail hereinbelow, the acceleration differentiator 9 also includes an override circuit which is provided when the input signal A has a positive slope or acceleration which is beyond a predetermined acceleration threshold as determined by a comparator circuit. When this threshold is reached, a signal $V_1$ is provided which provides braking, regardless of where the input signal A is with reference to the imaginary ramp.

Figure 3:
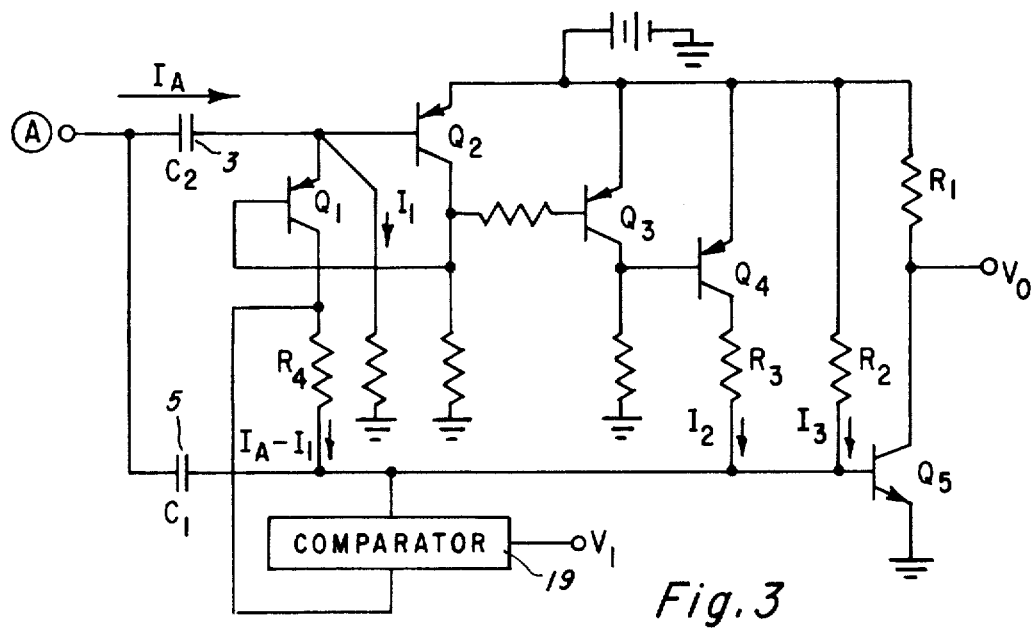
FIG. 3 is a circuit diagram of the slip-deceleration rate detector and acceleration differentiator of FIG. 1.

Referring to FIG. 3, there is shown a circuit diagram of the skid conrol system of FIG. 1 including the capacitors 3 and 5, the detector 7 and differentiator 9. The slip/deceleration rate detector 7 is composed of transistor Q5, resistor R1 and capacitor 5 or C1. The transistor Q5 is normally biased on because the current $I_3$ through resistor R2 and the current $I_2$ through saturated transistor Q4 provide sufficient current to provide this condition. Accordingly, the output $V_0$ for this condition is at approximately ground or in a logical 0 or a brake condition. It is therefore apparent that the bias current for transistor Q5 is $I_2 + I_3$ when there is no input or a constant input A. In the preferred embodiment, this is the equivalent of providing an imaginary ramp of 45 feet per second$^2$.

When there is a negative slope input A, capacitor C1 charges up by means of current $I_2$ and $I_3$ and pulls this current away from the base of transistor Q5. When this current drained by the capacitor C1 is equal to the sum of $I_2 + I_3$, then transistor Q5 turns off and provides a high voltage at the output $V_0$. This provides a no-brake condition, or a logical 1 output at $V_0$. If the input A has a negative slope and is sufficient to pull more current than the sum of $I_2 + I_3$ from the base of transistor Q5, then the base of transistor Q5 goes negative. Therefore, when deceleration stops, the base of transistor Q5 charges up to $V_{BE}$ above ground. The charge rate is determined by the amount of current $I_2 + I_3$, the time for conduction of transistor Q5 being determined by the time required to charge capacitor C1 back to the original threshold rate to provide the imaginary ramp. This provides a delay after the stop of deceleration based upon the time for charging of the capacitor C1 through resistors R3 and R2.

To change the slope of the imaginary ramp, it is necessary to change the amount of current $I_2 + I_3$. This is provided by observing the positive slope of the input signal A through the acceleration differentiator 9 which comprises transistors Q1 and Q2. As the input A goes positive, current is supplied to the base of transistor Q2 through capacitor $C_2$ or 3. The transistor Q2 conducts and the current in the collector circuit of transistor Q2 is fed back to the base of transistor Q1, thereby regulating the base of transistor $Q_2$ to a constant voltage. As more current is fed back to transistor $Q_1$, transistor $Q_2$ turns off and drops the voltage at the base of transistor $Q_1$ to turn on transistor $Q_1$ and causes it to draw the same amount of current out of the base circuit of the transistor $Q_2$ as was originally being fed thereto. This current is $I_4-I_1$ which passes through the collector circuit of transistor $Q_1$. This saturates transistor $Q_2$ and turns transistor $Q_3$ off to allow transistor $Q_4$ to turn on and provide current $I_2$. When the input current $I_4$ is equal to $I_1$, transistor $Q_2$ comes out of saturation and begins to regulate the input current. This turns transistor $Q_3$ on and turns transistor $Q_4$ off, to remove current $I_2$ from the base of transistor $Q_5$. This switches the threshold of the imaginary ramp from 45 feet per second$^2$ to 5 feet per second$^2$. At the same time, as current $I_4$ exceeds current $I_1$, current $I_4-I_1$ is placed into the base of transistor $Q_5$ and increases the current from $I_3$ proportional to the rate of acceleration to the maximum rate of 200 feet per second$^2$. So the imaginary ramp increases and deceleration threshold increases.

The circuit also includes an acceleration threshold comparator 19 which is tied across the resistor $R_4$ in the collector circuit of the transistor $Q_1$. When $I_4$ is positive going and exceeds a predetermined value as set in the comparator 19, the voltage across the resistor $R_4$ will be such to trigger the comparator 19 and provide an output signal $V_1$ which will provide the necessary braking as discussed in connection with the example of FIG. 1.

It is therefore apparent that, in accordance with the present invention, there is provided a low cost skid control system which provides an imaginary ramp circuit which is internally programmed and which will turn the brakes on and off as required to prevent skid. The circuit also includes an acceleration override to apply brakes where an acceleration threshold has been exceeded.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

What is claimed is:

1. A vehicle skid control system for selectively controlling the engagement and disengagement of the brake system of the vehicle in accordance with selected braking conditions, comprising in combination:

means for generating a signal proportional to vehicle wheel speed, a slip signal-deceleration rate detector means, an acceleration differentiator means connected in parallel to said slip signal-deceleration rate detector means, said wheel speed signal generating means being connected to the inputs of said slip signal-deceleration rate detector means and said acceleration differentiator means for simultaneously providing said wheel speed signal thereto, said slip signal-deceleration rate detector means being responsive to a negative slope of said wheel speed signal exceeding a predetermined deceleration rate threshold for providing a first brake control signal as an output, said acceleration differentiator means being responsive to a positive slope of said wheel speed signal to provide as one output an imaginary ramp signal proportional to the rate of acceleration of said wheel speed signal and being connected as an input to said slip signal-deceleration rate detector means, brake controller means responsive to at least said first brake control signal for providing a brake inhibiting signal, and said slip signal-deceleration rate detector means being responsive to said imaginary ramp signal from said acceleration differentiator means for discontinuing said first brake control signal when the acceleration spin-up causes said wheel speed signal to intersect with the imaginary ramp programmed by said imaginary ramp signal.

2. A vehicle skid control system as set forth in claim 1, wherein the imaginary ramp programmed by said imaginary ramp signal provided as one output from said acceleration differentiator means has a plurality of modes in which the respective slopes thereof differ in value, and the particular mode of the imaginary ramp being employed at any one instance being determined by the acceleration rate of said wheel speed signal.

3. A vehicle skid control system as set forth in claim 2, wherein said acceleration differentiator means has a second output connected to said brake controller means, said acceleration differentiator means being responsive to a positive slope of said wheel speed signal having a value in excess of a predetermined acceleration rate threshold to provide a second brake control signal at said second output, and said brake controller means being responsive to said second brake control signal to enable normal vehicle braking to occur.

4. A vehicle skid control system as set forth in claim 3, wherein said acceleration differentiator means includes a comparator having a predetermined acceleration rate threshold value set therein, said comparator providing said second output of said acceleration differentiator means which is connected to said brake controller means and being responsive to a positive slope of said wheel speed signal having a value in excess of said predetermined acceleration rate threshold value to provide said second brake control signal at said second output.

5. A vehicle skid control system as set forth in claim 4, wherein said brake controller means comprises an AND gate, and inverter means interposed between the second output of said acceleration differentiator means and said AND gate.

* * * * *